United States Patent
Hammers et al.

(10) Patent No.: US 6,608,839 B1
(45) Date of Patent: Aug. 19, 2003

(54) SYSTEM AND METHOD FOR INDICATING AN ACCURATE COMMITTED INFORMATION RATE

(75) Inventors: David P. Hammers, Palm Harbor, FL (US); Charles S. Kenworthy, Tampa, FL (US)

(73) Assignee: Paradyne Corporation, Largo, FL (US)

(*) Notice: Subject to any disclaimer, the term of this patent is extended or adjusted under 35 U.S.C. 154(b) by 0 days.

(21) Appl. No.: 09/383,285

(22) Filed: Aug. 25, 1999

Related U.S. Application Data (60) Provisional application No. 60/117,127, filed on Jan. 25, 1999.

(51) Int. Cl.⁷ .............................................. H04L 12/28
(52) U.S. Cl. ................. 370/465; 370/466; 370/395.63; 710/72
(58) Field of Search ................................. 370/465, 464, 370/466, 467, 474, 395.63, 395.64, 395.65, 395.5, 395.1, 389, 352, 353, 232, 229, 401; 709/238, 229; 710/72

(56) References Cited

U.S. PATENT DOCUMENTS

| | | | | |
|---|---|---|---|---|
| 5,420,858 | A | * 5/1995 | Marshall | 370/352 |
| 5,490,140 | A | * 2/1996 | Abensour | 370/352 |
| 5,528,590 | A | * 6/1996 | Iidaka | 370/395.65 |
| 6,064,648 | A | * 5/2000 | Hellman | 370/230 |
| 6,185,189 | B1 | * 2/2001 | Brassier | 370/236 |
| 6,205,152 | B1 | * 3/2001 | Von Ahnen | 370/419 |
| 6,226,260 | B1 | * 5/2001 | McDysan | 370/216 |
| 6,237,054 | B1 | * 5/2001 | Freitag, Jr. | 710/72 |
| 6,252,887 | B1 | * 6/2001 | Wallace | 370/466 |
| 6,400,727 | B1 | * 6/2002 | Lim | 370/465 |
| 6,519,595 | B1 | * 2/2003 | Rose | 707/10 |
| 6,526,063 | B1 | * 2/2003 | St-Amand | 370/395.5 |

OTHER PUBLICATIONS

"The ATM Forum, Technical Committee, BISDN Inter Carrier Interface (B–ICI) Specifications," Version 2.0 (Integrated), af–bici–0013.003, App. A, Initial Guidelines for FRS Traffic Characterization at the B–ICI, 12/95.

* cited by examiner

Primary Examiner—Douglas Olms
Assistant Examiner—Ricardo M. Pizarro
(74) Attorney, Agent, or Firm—Thomas, Kayden, Horstemeyer & Risley, LLP (57) ABSTRACT

Disclosed is a system and method for determining an efficient and accurate committed information rate (CIR) for a frame relay data communications device to facilitate the conversion of frame relay data packets into asynchronous transfer mode (ATM) data cells. In one embodiment, the present system includes a processor coupled to a local interface, a memory coupled to the local interface, an adaptive CIR logic stored in the memory, the adaptive CIR logic being executed by the processor, the adaptive CIR logic including: sample identification logic to identify at least one sample group of a number of data packets transmitted across a data communications link, the data packets having a variable length and the data cells having a fixed length, modeling logic to adapt a modeled packet size of the frame relay data packets transmitted across the data communications link based upon the data packets in the sample group, and, logic to calculate an efficient committed information rate based upon the modeled packet size. The adaptive CIR logic may also be implemented in terms of a dedicated logical circuit or by a combination of a processor circuit and dedicated logical circuits.

15 Claims, 5 Drawing Sheets

Fig. 5

# SYSTEM AND METHOD FOR INDICATING AN ACCURATE COMMITTED INFORMATION RATE

CLAIM OF PRIORITY

This document claims priority to and the benefit of the filing date of co-pending and commonly assigned provisional application entitled "Automatic Computation of Frame Committed Information Rate and Excess Burst Size by an Asynchronous Transfer Mode-to-Frame Relay Service Interworking Access Product Using Adaptive Averaging to Determine Accurate Packet Sizes", assigned Ser. No. 60/117,127, filed Jan. 25, 1999, under and incorporated herein by reference.

TECHNICAL FIELD

The present invention relates generally to data communications, and more particularly, to a system and method for indicating an efficient information rate during a data format conversion.

BACKGROUND OF THE INVENTION

Data communications employs many different data communications protocols to transmit data from one point to another in various networks. Oftentimes, a data link between two endpoints requires the use of more than one type of protocol, where protocol conversion devices are employed to effect the conversion. An example would be the use of frame relay networks and asynchronous transfer mode (ATM) networks in a single data link.

To explain further, frame relay format transmits data in the form of data frames or packets that will vary in length and include a data payload of variable length, anywhere from 1 byte to 4 kilobytes. ATM format employs 53 byte cells that carry a data payload of a fixed 48 bytes per cell. A frame relay device typically provides a specific committed information rate (CIR) for an end user that is generally a rate of information exchange based upon the type of data payloads transmitted.

ATM network service providers also configure their networks to guarantee end users with a specific rate of information exchange known as a sustained cell rate (SCR). The sustained cell rate refers to the number of ATM cells that may be transmitted per second carrying the end user's data in a continuous manner.

In some cases, an end user may employ devices that use a frame relay protocol, but may wish to link up to a ATM network to achieve high speed communication with a remote location linked to the ATM network. As such, the end user may employ a frame relay/ATM conversion device to convert the data frames into ATM cells. In these situations, the end user often pays for and receives a specific SCR for the ATM connection. For a given SCR, there is a particular calculated CIR that can be accommodated. Typically the end user receives periodic reports from the ATM service provider as to the amount of the end user's data transferred at what data rates via the ATM network. By comparing the report to the calculated CIR, the user can determine how much of their data was transferred at a data rate above and below the calculated CIR. Any such data transferred above the calculated CIR is subject to being dropped since it exceeds the contracted data rate. Consequently, it is in the end user's interest to ensure that the contracted SCR is high enough to prevent such a loss of data.

However, due to the conversion from frame relay into ATM, the calculated CIR is not always an accurate value due to the fact that an estimated value for the data packet size is used in the calculation of the CIR at a given SCR. The inaccuracy of this estimated value may result in an inaccurately calculated CIR.

SUMMARY OF THE INVENTION

In light of the forgoing, the present invention provides a system and method for determining an efficient and accurate committed information rate (CIR) for a frame relay data communications device to facilitate the conversion of frame relay data packets into asynchronous transfer mode (ATM) data cells. In one embodiment, the present system includes a processor coupled to a local interface, a memory coupled to the local interface, an adaptive CIR logic stored in the memory, the adaptive CIR logic being executed by the processor, the adaptive CIR logic including: sample identification logic to identify at least one sample group of a number of data packets transmitted across a data communications link, the data packets having a variable length and the data cells having a fixed length, modeling logic to adapt a modeled packet size of the frame relay data packets transmitted across the data communications link based upon the data packets in the sample group, and, logic to calculate an efficient committed information rate based upon the modeled packet size. The adaptive CIR logic may also be implemented in terms of a dedicated logical circuit or by a combination of a processor circuit and dedicated logical circuits.

In another embodiment, the method of the present invention is provided for determining an efficient committed information rate (CIR) for a frame relay data communications device to facilitate the conversion of frame relay data packets into asynchronous transfer mode (ATM) data cells, comprising the steps of: identifying at least one sample group of a number of data packets transmitted across a data communications link, the data packets having a variable length and the data cells having a fixed length; adapting a modeled packet size of the frame relay data packets transmitted across the data communications link based upon the data packets in the sample group; and, calculating the efficient committed information rate based upon the modeled packet size.

The present invention provides a distinct advantage in that a more accurate and efficient CIR is calculated on the frame relay side of a frame relay/ATM conversion. An accurately determined CIR allows the user who employs frame relay to know what information rates to expect as a result of a contracted for ATM service. Thus the frame relay user can better decide if they need to contract for a smaller or greater SCR from their ATM service provider.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
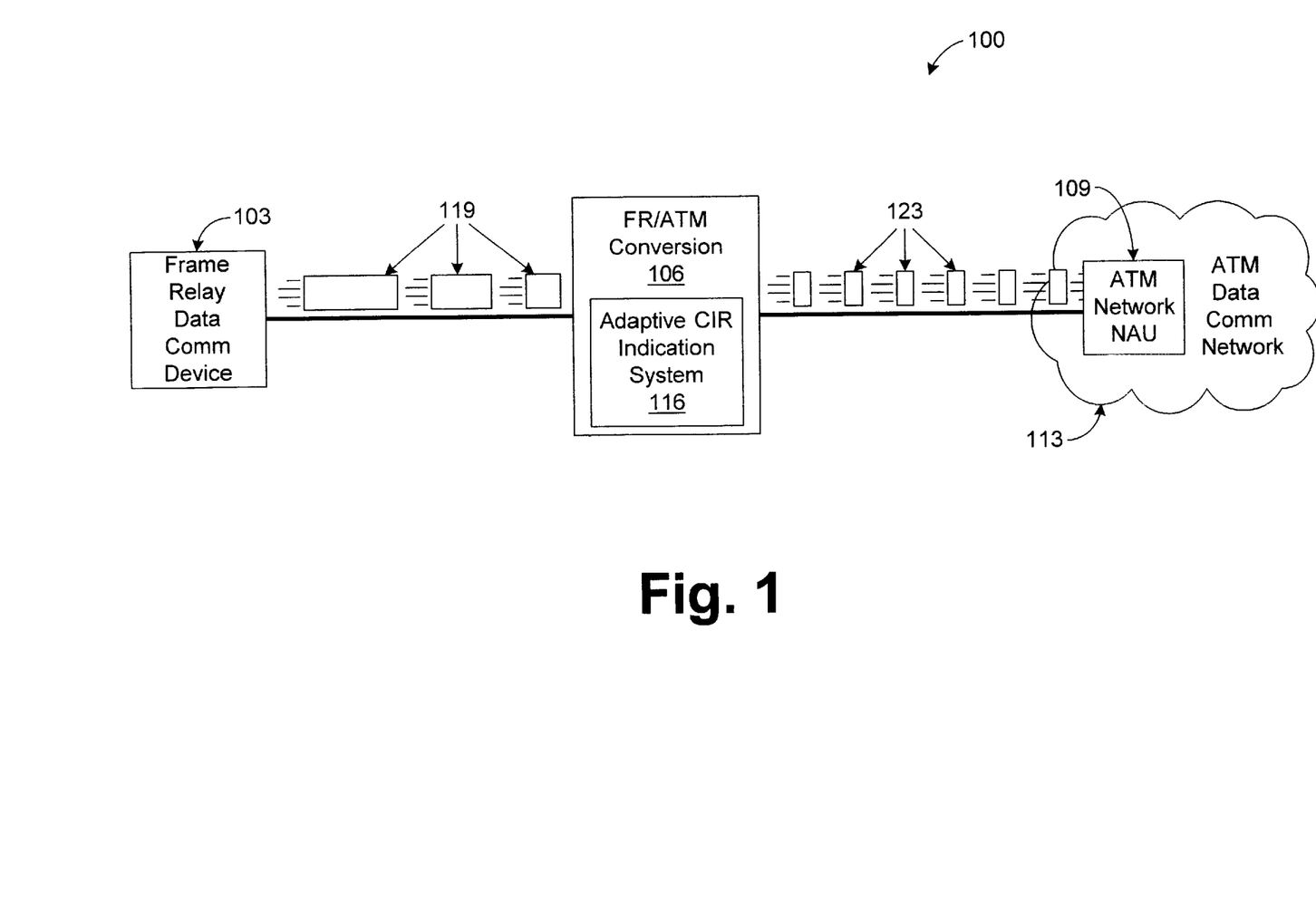
FIG. 1 is a block diagram of a data communications system according to an embodiment of the present invention.

With reference to FIG. 1, shown is a data communications system 100. The data communications system 100 includes a frame relay (FR) data communications device 103 that is in electrical communication with a frame relay/asynchronous transfer mode (FR/ATM) conversion device 106. The FR/ATM conversion device 106 is in electrical communication with an ATM network access unit 109 that provides access to an ATM network 113. Resident within the FR/ATM conversion device 106 is an adaptive committed information rate (CIR) indication system 116. The frame relay data communications device 103 may be, for example, a computer system, a router coupled to a local area network, or other similar device. In this sense the frame relay data communications device 103 may generate or receive data that is to be transmitted across the ATM network 113 to a particular destination.

The basic operation of the data communications system 100 is as follows. The frame relay data communications device 103 generates or receives data to be transmitted to a data communications device (not shown) that is connected to the ATM network 113. The frame relay data communications device may generate or receive either raw data, data in the form of data frames, or data formatted according to a particular data communications protocol.

The frame relay data communications device 103 packages the data into data frames 119 according to frame relay protocol unless they were received in such form and transmits the data frames to the FR/ATM conversion device 106. The FR/ATM conversion device 106 receives and disassembles the data frames 119 and generates ATM cells 123 from the data and header information contained in the data frames 119. Thereafter, the ATM cells 123 are transmitted to the ATM network access unit 109 and ultimately to a final destination that is coupled to the ATM network 113.

According to frame relay format, the data frames 119 vary in length. Each data frame 119 generally includes a header of two bytes and can include a data payload from a single byte to 4000 bytes in length that is followed by a trailer that is typically 4 bytes in length. The ATM cells 123, on the other hand, have a fixed length of 53 bytes that includes 5 bytes of header information and 48 bytes of data payload. The ATM service provider typically guarantees a specific sustained cell rate (SCR) or cells/sec to transmit the information across the ATM network. Likewise, the frame relay components operate at a specific committed information rate Typically, in light of the variation of the length of the data frames, there is a estimated length or packet size based upon the type of information that is transmitted from the frame relay data communications device 103. According to the present invention, this estimated packet size is used to calculate the CIR. These calculations are detailed in The ATM Forum, Technical Committee, BISDN Inter Carrier Interface (B-ICI) Specification, Version 2.0 (Integrated), af-bici-0013.003, Appendix A, Initial Guidelines for FRS Traffic Characterization at the B-ICI, December, 1995. The problem is that the estimated packet size may be inaccurate. Since the actual value is generally unknown, the CIR cannot be accurately calculated. Consequently, the end user does not have an accurate CIR with which to determine what portion of the data transferred via the ATM link is subject to being dropped when the information rate exceeds the CIR. In other words, the end user does not know the CIR that translates into the given SCR that the end user obtains from the ATM service provider. According to the present invention, the adaptive CIR indication system 116 employs logic to determine a modeled packet size from which a value for an efficient CIR can be calculated.

Figure 2:
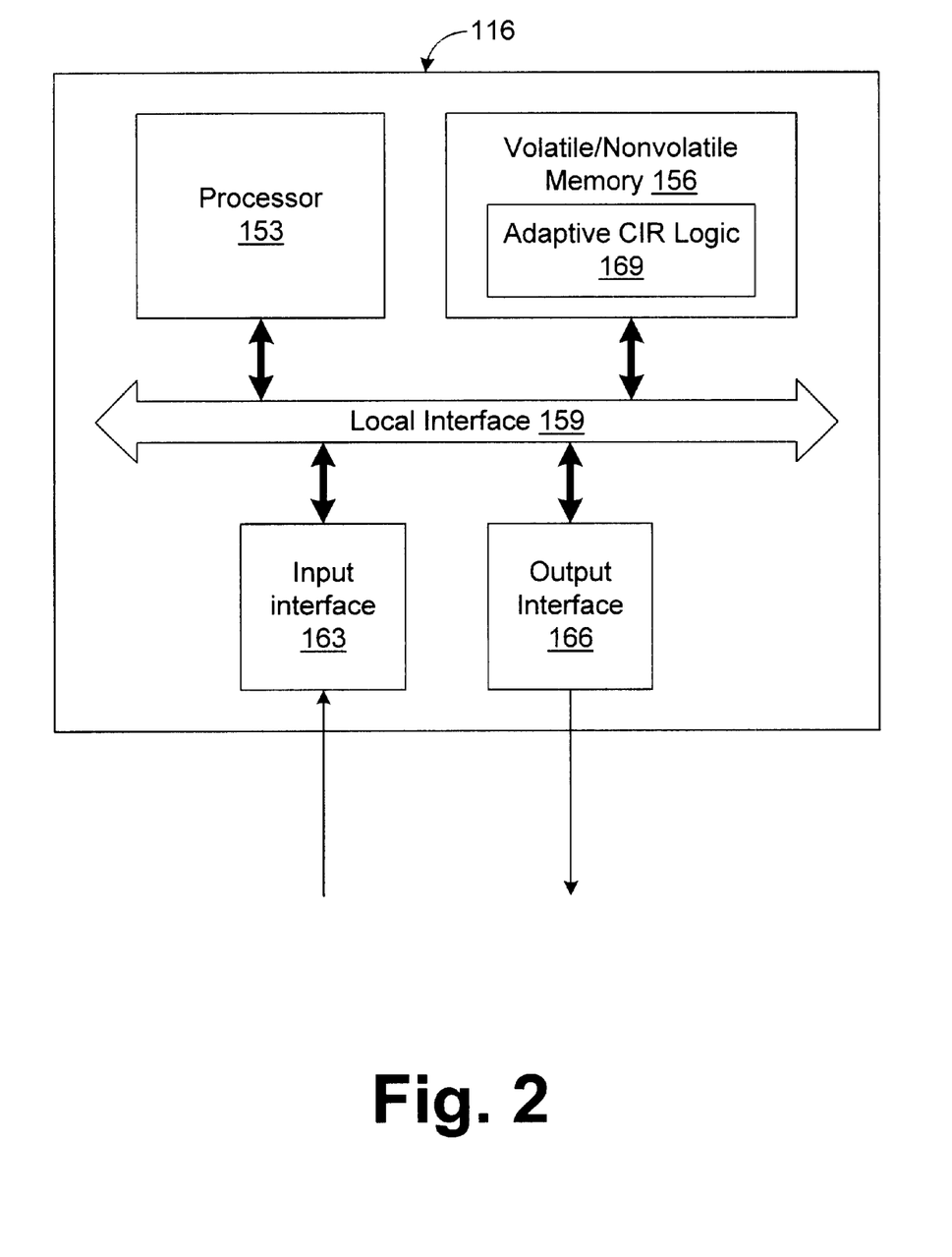
FIG. 2 is a block diagram of an adaptive committed information rate (CIR) indication system employed in the data communications system of FIG. 1.

With reference to FIG. 2, shown is a block diagram of a first embodiment of the adaptive CIR indication system 116 according to the present invention. According to this embodiment, the adaptive CIR indication system 116 includes a processor 153 and a volatile/non-volatile memory 156. The processor 153 and the volatile/non-volatile memory 156 are in electrical communication via a local interface 159. The local interface 159 may comprise, for example, both a data bus and a control bus to facilitate the exchange of data. The volatile/nonvolatile memory 156 may comprise, for example, random access memory, read-only memory, hard drives, floppy disk drives, compact discs, tape drives, or other means for data storage.

The adaptive CIR indication system 116 also includes an input interface 163 and an output interface 166. The input interface 163 makes various input data available on the local interface 159 to be manipulated by the processor 153. The input data may include, for example, a number of frame relay data frames, various parameters related to such data frames, or similar information. The output interface 166 makes data on the local interface 159 available to outside data communication equipment or other devices. The output data could be in the form of, for example, ATM data cells or other data forms.

The adaptive CIR indication system 116 further comprises adaptive CIR logic 169 that is stored on the volatile/nonvolatile memory 156. The adaptive CIR logic 169 is executed by the processor 153 to perform the functionality of the adaptive CIR indication system 116. Note that the adaptive CIR indication system 116 is shown to be a general processor circuit. Although the adaptive CIR logic 169 is shown alone, it is understood that other operating logic may be stored on the volatile/nonvolatile memory 156 to accomplish other functionality of the FR/ATM conversion device 106, where the adaptive CIR logic 169 performs the functionality of determining an accurate and efficient CIR for a specific frame relay to ATM conversion.

In addition, although the adaptive CIR logic 169 is depicted in a software implementation in FIG. 2, it is understood that the adaptive CIR logic 169 may be implemented in hardware, such as, for example, in the form of a dedicated logical circuit. The adaptive CIR logic 169 may also be implemented in a combination of software and hardware using various dedicated logical circuits. If implemented in hardware as in an alternative embodiment, the adaptive CIR logic 169 can implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc.

Figure 3:
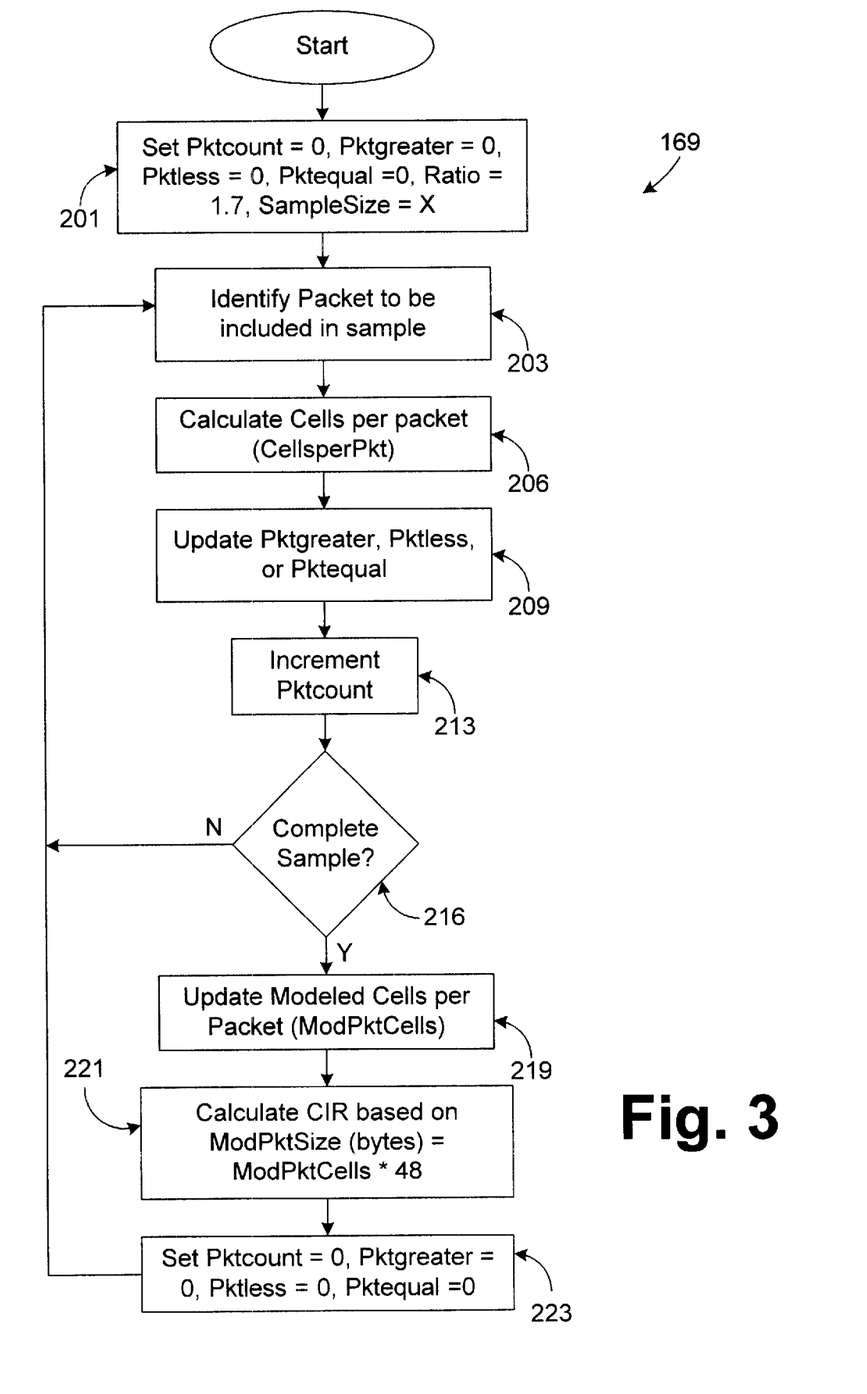
FIG. 3 is a flow chart of adaptive CIR logic executed by the adaptive CIR indication system of FIG. 2.

Turning next, to FIG. 3, shown is an embodiment of the adaptive CIR logic 169 that is executed to determine an accurate and efficient CIR according to the present invention. The adaptive CIR logic 169 begins at block 201 in which the system is initialized by setting variables equal to preset values. The variables include, for example, Pktcount, ModPktCells, ModPktSize, Pktgreater, Pktless, Pktequal, Ratio, and SampleSize. Pktcount is a variable that is employed to keep track of a number of samples in a sample set of frame relay data packets as will be discussed. ModPktCells indicates a modeled number of ATM cells per packet for the data packets derived from the size of the data packets in the sample sets. ModPktSize indicates a model packet size of the packets from the frame relay devices that is derived from the ModPktCells value. Pktgreater, Pktless, Pktequal, and the Ratio variable are employed in maintaining the ModPktCells value. Finally, the SampleSize variable indicates the size of the sample set.

After initializing the variables in block 201, the adaptive CIR logic 169 then progresses to block 203 in which an incoming frame relay data packet is identified or selected to be included in a sample set of data packets. Thereafter, in block 206 the adaptive CIR logic 169 calculates a number of ATM cells corresponding to the identified frame relay data packet or the ATM cells-per-packet (Cells perPkt) from block 203. The adaptive CIR logic 169 then progresses to block 209 in which one of the variables Pktgreater, Pktless, or Pktequal is incremented in light of the number of ATM cells are necessary to transmit the identified frame relay data packet (CellsperPkt) from block 203. Then, in block 213 the variable Pktcount, is incremented.

Next, in block 216, the adaptive CIR logic 169 determines whether the sample set of data packets is complete. This may be done, for example, by determining whether the value of Pktcount is equal to the SampleSize variable set at the initialization stage. If the sample set is complete, then the adaptive CIR logic 169 progresses to block 219. If not, then the adaptive CIR logic 169 reverts back to block 203 to acquire an additional data packet. In block 219, the variable ModPktCells is updated in light of the recently completed sample set. Then, in block 221, a value for the modeled packet size (ModPktSize) is determined from the ModPktCells variable. In particular, ModPktSize is calculated by multiplying ModPktCells by 48 to obtain the number of bytes that can be transmitted in a number of ATM cells equal to ModPktCells. In a sense the packet size is rounded up so that the modeled packet size completely fills the ATM cells. This provides the largest information rate that can be transmitted given the SCR.

This is to say that a particular packet size may fill a certain number of ATM cells, where one of the ATM cells may be partially filled due to a mismatch in the packet size and the number of bytes available in the ATM cells. To "round up" the packet size means to determine the modeled packet size above an actual packet size so that there are no partially filled ATM cells. This "rounded up" modeled packet size is then used to calculate an accurate CIR that may be accommodated by the corresponding ATM cell rate. Thereafter, in block 223 the variables Pktcount, Pktgreater, Pktless, and Pktequal are set equal to zero and then the adaptive CIR logic 169 reverts back to block 203 to acquire these values for another sample set.

Figure 4:
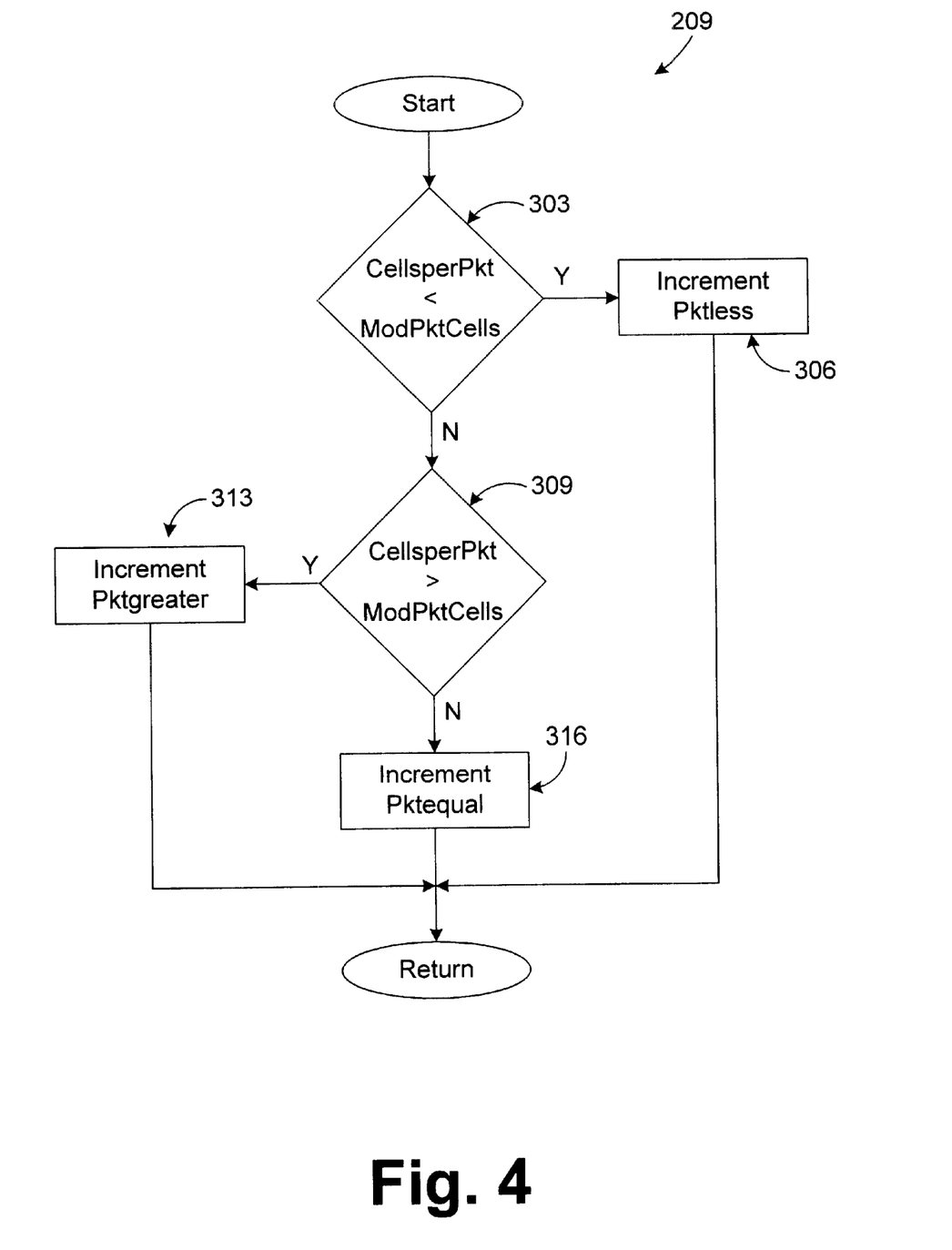
FIG. 4 is a flow chart of a first subroutine of the adaptive CIR logic of FIG. 3.

With reference to FIG. 4, shown is a subroutine that accomplishes the functionality of block 209 (FIG. 3). Beginning with block 303, the number of ATM cells corresponding to the current data packet (CellsperPkt) is compared with the current modeled number of ATM cells per packet (ModPktCells). If the current cells per packet (CellsperPkt) value is less than the modeled number of ATM cells per packet (ModPktCells), then the subroutine 209 moves to block 306 where the variable Pktless is incremented. If not, then the subroutine 209 progresses to block 309. If in block 309, the current cells per packet is greater than the modeled number of ATM cells per packet (ModPktCells), then the subroutine 209 progresses to block 313 where the variable Pktgreater is incremented. Otherwise, the subroutine 209 progresses to block 316 in which the Pktequal variable is incremented. From blocks 306, 313, and 316 the subroutine 209 returns accordingly.

Figure 5:
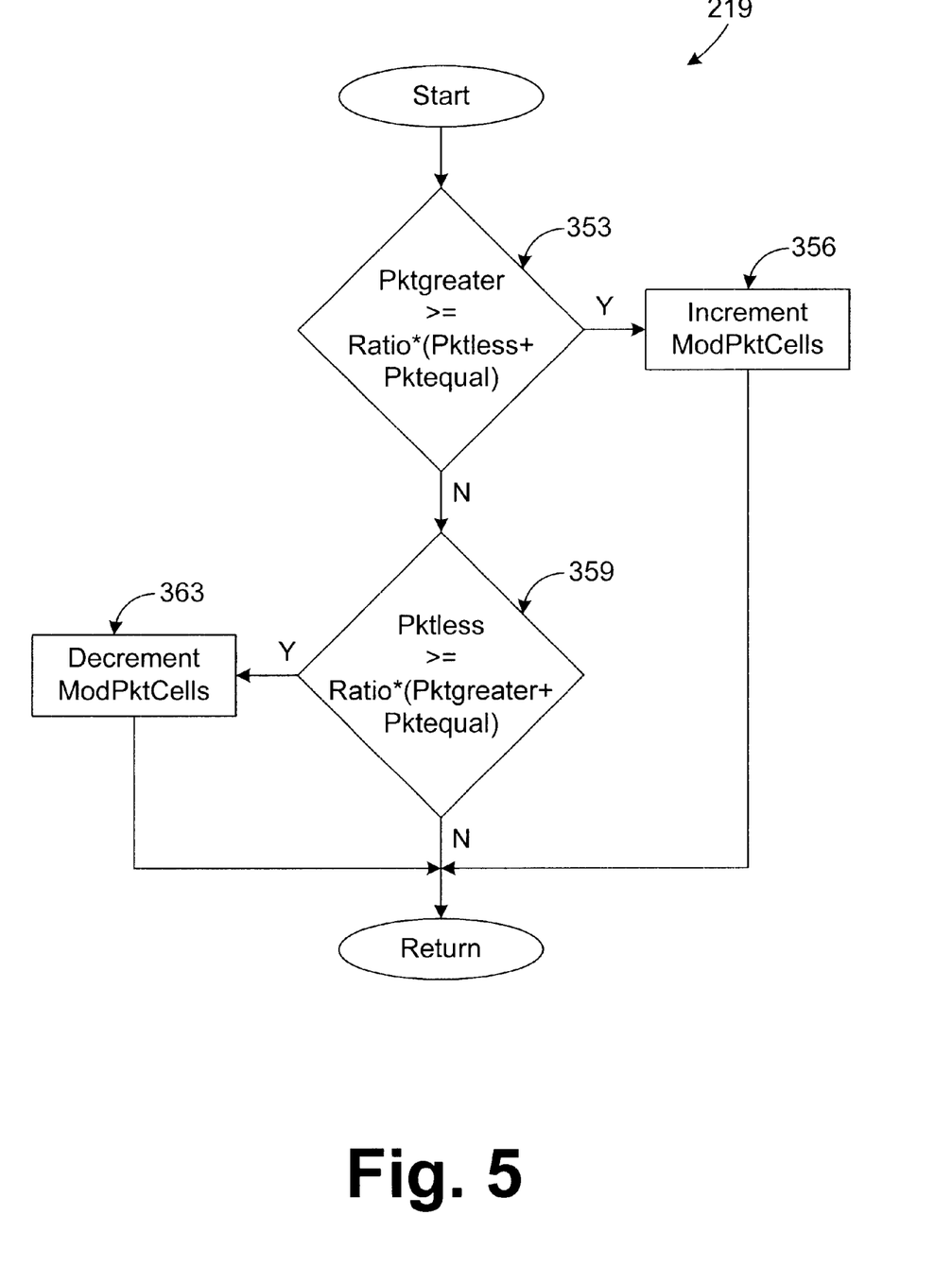
FIG. 5 is a flow chart of a second subroutine of the adaptive CIR logic of FIG. 3.

Turning then, to FIG. 5, shown is a second subroutine that performs the functionality of block 219 (FIG. 3). The second subroutine 219 begins with block 353 in which the variable Pktgreater is compared to a result of a first threshold calculated using the equation Ratio*(Pktless+Pktequal). If, in block 353, Pktgreater is greater than or equal to Ratio*(Pktless+Pktequal), then the second subroutine 219 progresses to block 356 in which the modeled cells per packet (ModPktCells) is incremented. Otherwise, the second subroutine 219 progresses to block 359. In block 359, the variable Pktless is compared to a second threshold calculated using the equation Ratio*(Pktgreater+Pktequal). If in block 359, Pktless is greater than or equal to Ratio*(Pktgreater+Pktequal), then the second subroutine 219 moves to block 363 in which the modeled number of cells per packet (ModPktCells) is decremented accordingly. Thereafter, from blocks 363, 359, and 356, the second subroutine returns accordingly. Notice that the value for Ratio provides a threshold by which the modeled number of cells per packet (ModPktCells) is changed, thus providing a zone within which the ModPktCells remains stable. Thus the value of Ratio is a stabilization factor that prevents too much fluctuation in the ModPktCells value while, at the same time, adjusting the ModPktCells value accordingly to accurately reflect the actual value. The actual value used for the Ratio variable may be any value depending upon the degree of stabilization desired and the type of data frames that are transformed into ATM cells. According to one embodiment, the Ratio variable is set to a factor of approximately 1.7. It is noted that other approaches may be employed to calculate the first and second thresholds noted above as well as determining a stabilization factor and such approaches are expressly included herein.

Also, there are many other approaches that may be employed in determining the modeled packet size with which to calculate an accurate CIR. These approaches may be, for example, taking a statistical average of a sample set of cells/packet and then statistically calculating an average cells per packet from which a modeled packet size may be determined. These approaches are expressly included herein.

Referring back to FIG. 1, it is further understood that the adaptive CIR indication system 116 may also reside in the ATM network NAU 109 or wherever a conversion from a frame relay protocol to an ATM protocol is achieved, and is not restricted to the FR/ATM conversion device 106.

Also note that the flow chart of FIGS. 3, 4, and 5 show the architecture, functionality, and operation of a possible implementation of the adaptive CIR logic 169. In this regard, each block represents a module, segment, or portion of code, which comprises one or more executable instructions for implementing the specified logical function(s). It should also be noted that in some alternative implementations, the functions noted in the blocks may occur out of the order noted in FIGS. 3, 4, and 5. For example, two blocks shown in succession in FIGS. 3, 4, and 5 may in fact be executed substantially concurrently or the blocks may sometimes be executed in the reverse order, depending upon the functionality involved.

The adaptive CIR logic 169, that comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Many variations and modifications may be made to the above-described embodiment(s) of the invention without departing substantially from the spirit and principles of the invention. All such modifications and variations are intended to be included herein within the scope of the present invention.

Therefore, having thus described the invention, at least the following is claimed:

1. A system for determining a committed information rate (CIR) for a frame relay data communications device to facilitate the conversion of frame relay data packets into asynchronous transfer mode (ATM) data cells, comprising:
   a processor coupled to a local interface;
   a memory coupled to the local interface;
   an adaptive CIR logic stored in the memory, the adaptive CIR logic being executed by the processor, the adaptive CIR logic including:
      sample identification logic to identify at least one sample group of a number of data packets transmitted across a data communications link, the data packets having a variable length and the data cells having a fixed length; and
      modeling logic to adapt a modeled packet size of the frame relay data packets transmitted across the data communications link based upon the data packets in the sample group; and
      modeling logic to calculate an efficient committed information rate based upon the modeled packet size.

2. The system of claim 1, wherein the modeling logic further comprises:
   logic to maintain a modeled number of cells per packet for the sample group; and
   logic to adjust the modeled packet size based upon the modeled number of cells per packet for the sample group.

3. The system of claim 1, wherein the modeling logic further comprises:
   logic to determine a packet size for each of the data packets in the sample group;
   logic defining a first counter variable that is incremented when the packet size for a data packet in the sample group is less than the modeled packet size;
   logic defining a second counter variable that is incremented when the packet size for a data packet in the sample group is greater than the modeled packet size; and
   logic defining a third counter variable that is incremented when the packet size for a data packet in the sample group is equal to the modeled packet size.

4. The system of claim 3, wherein the modeling logic further comprises:
   logic to decrement the modeled packet size if the first counter variable is above a first calculated threshold; and
   logic to increment the modeled packet size if the second counter variable is above a second calculated threshold.

5. The system of claim 4, wherein the first calculated threshold is equal to $R*$(second counter variable+third counter variable), and the second calculated threshold is equal to $R*$(first counter variable+third counter variable), where R is a predefined constant.

6. A system for determining an efficient committed information rate (CIR) for a frame relay data communications device to facilitate the conversion of frame relay data packets into asynchronous transfer mode (ATM) data cells, comprising:
   identifying means for identifying at least one sample group of a number of data packets transmitted across a data communications link, the data packets having a variable length and the data cells having a fixed length;
   modeling means for adapting a modeled packet size of the frame relay data packets transmitted across the data communications link based upon the data packets in the sample group; and
   calculating means for calculating the efficient committed information rate based upon the modeled packet size.

7. The system of claim 6, wherein the modeling means further comprises:
   means for maintaining a modeled number of cells per packet for the sample group; and
   means for adjusting the modeled packet size based upon the modeled number of cells per packet for the sample group.

8. The system of claim 6, wherein the modeling means further comprises:
   means for determining a packet size for each of the data packets in the sample group;
   a first counter variable that is incremented when the packet size for a data packet in the sample group is less than the modeled packet size;
   a second counter variable that is incremented when the packet size for a data packet in the sample group is greater than the modeled packet size; and
   a third counter variable that is incremented when the packet size for a data packet in the sample group is equal to the modeled packet size.

9. The system of claim 8, wherein the modeling means further comprises:
   means for decrementing the modeled packet size if the first counter variable is above a first calculated threshold; and means for incrementing the modeled packet size if the second counter variable is above a second calculated threshold.

10. The system of claim 9, wherein the first calculated threshold is equal to R*(second counter variable+third counter variable), and the second calculated threshold is equal to R*(first counter variable+third counter variable), where R is a predefined constant.

11. A method for determining an efficient committed information rate (CIR) for a frame relay data communications device to facilitate the conversion of frame relay data packets into asynchronous transfer mode (ATM) data cells, comprising the steps of:

identifying at least one sample group of a number of data packets transmitted across a data communications link, the data packets having a variable length and the data cells having a fixed length;

adapting a modeled packet size of the frame relay data packets transmitted across the data communications link based upon the data packets in the sample group; and calculating the efficient committed information rate based upon the modeled packet size.

12. The method of claim 11, wherein the step of adapting the modeled packet size further comprises the steps of:

maintaining a modeled number of cells per packet for the sample group; and adjusting the modeled packet size based upon the modeled number of cells per packet for the sample group.

13. The method of claim 11, wherein the step of adapting the modeled packet size further comprises the steps of:

determining a packet size for each of the data packets in the sample group;

incrementing a first counter variable when the packet size for a data packet in the sample group is less than the modeled packet size;

incrementing a second counter variable when the packet size for a data packet in the sample group is greater than the modeled packet size; and incrementing a third counter variable when the packet size for a data packet in the sample group is equal to the modeled packet size.

14. The method of claim 13, wherein the step of adapting the modeled packet size further comprises the steps of:

decrementing the modeled packet size if the first counter variable is above a first calculated threshold; and incrementing the modeled packet size if the second counter variable is above a second calculated threshold.

15. The method of claim 14, wherein the step of adapting a modeled packet size further comprises the steps of:

calculating the first calculated threshold, the first calculated threshold being equal to R*(second counter variable+third counter variable); and calculating the second calculated threshold, the second calculated threshold being equal to R*(first counter variable+third counter variable), where R is a predefined constant.

* * * * *